Dec. 25, 1962  D. LA MAR CHRISTY  3,070,264
MACHINE FOR DISPENSING AND DISTRIBUTING COMMINUTED MATERIALS
Filed Sept. 1, 1961  3 Sheets-Sheet 3

Inventor.
Daniel La Mar Christy
By Wb. F. Kellogg
Atty

United States Patent Office 3,070,264
Patented Dec. 25, 1962

3,070,264
MACHINE FOR DISPENSING AND DISTRIBUTING COMMINUTED MATERIALS
Daniel La Mar Christy, 404 Dickinson St., Fremont, Ohio
Filed Sept. 1, 1961, Ser. No. 135,658
2 Claims. (Cl. 222—227)

This invention relates to improvements in machines for dispensing or sprinkling edible and/or non-edible matters, such, for example, as dust, flakes, flours, granules, meals, powders, edible seeds, etc. onto and over various forms and kinds, bodies, matters or materials.

Generally stated, the invention aims to provide a machine which in use will save material time and reduce production costs by automatically "dusting" or "topping" dry matters or ingredients, i.e., flour, starches, meals, sugars, salt, coconut, grated and sliced nuts, decorettes, etc. on bakery or other classes of food stuffs, or "dusting" or otherwise coating or topping the surfaces of non-edible materials, such as sheet glass, composition floor coverings, etc. with various forms of dry comminuted, flaked or similar material for decorative and utilitarian purposes.

It is also an object of the invention to provide a machine of the stated character which, by convenient and simple adjustment or modification, may be employed to dispense and distribute materials and matters of different degrees of coarseness, mesh or size onto receiving bodies, materials, or matters of different kinds (edible and/or non-edible) in a manner which will eliminate relatively costly and generally unsatisfactory hand or manual operations as well as increase production output and assure highly desirable efficiencies.

Another object of the invention is to provide a material sprinkling and distributing machine so constructed, assembled and operable as will permit convenient and rapid disassembly of the working parts thereof either for adjustment, cleaning, repair or replacement, such being of great advantage and benefit, especially when the machine is used for "dusting" or sprinkling edible matters and where sanitation and its maintenance is of importance.

A further object of the invention is to provide a matter dispensing and sprinkling machine which includes in its components means which are in constant operative though adjustable relation to the matter receiving and distributing means thereof whereby to assure the positive discharge of said matter onto and uniformly over the surface of receiving bodies either edible or non-edible, said means being readily removable and similarly reinstallable as and when desired or required.

Yet another object of the invention is to provide a machine of the stated character with quickly and simply interchangeable matter or material dispensing rolls or shafts whose peripheral surfaces are so formed as to receive and sprinkle or distribute matters or materials of different kinds, shapes and sizes, as, for example, powders, granules, meals, flakes, etc.

The foregoing, as well as other objects, advantages and meritorious teachings of my invention will be in part obvious and in part pointed out in the following detailed disclosure thereof, when taken in conjunction with the accompanying drawings, it being understood that the form of the invention presented herein is precise and what is now considered to be the best mode of embodying its principles, but that other modifications and changes may be made in specific embodiments without departing from its essential features.

Figure 1:
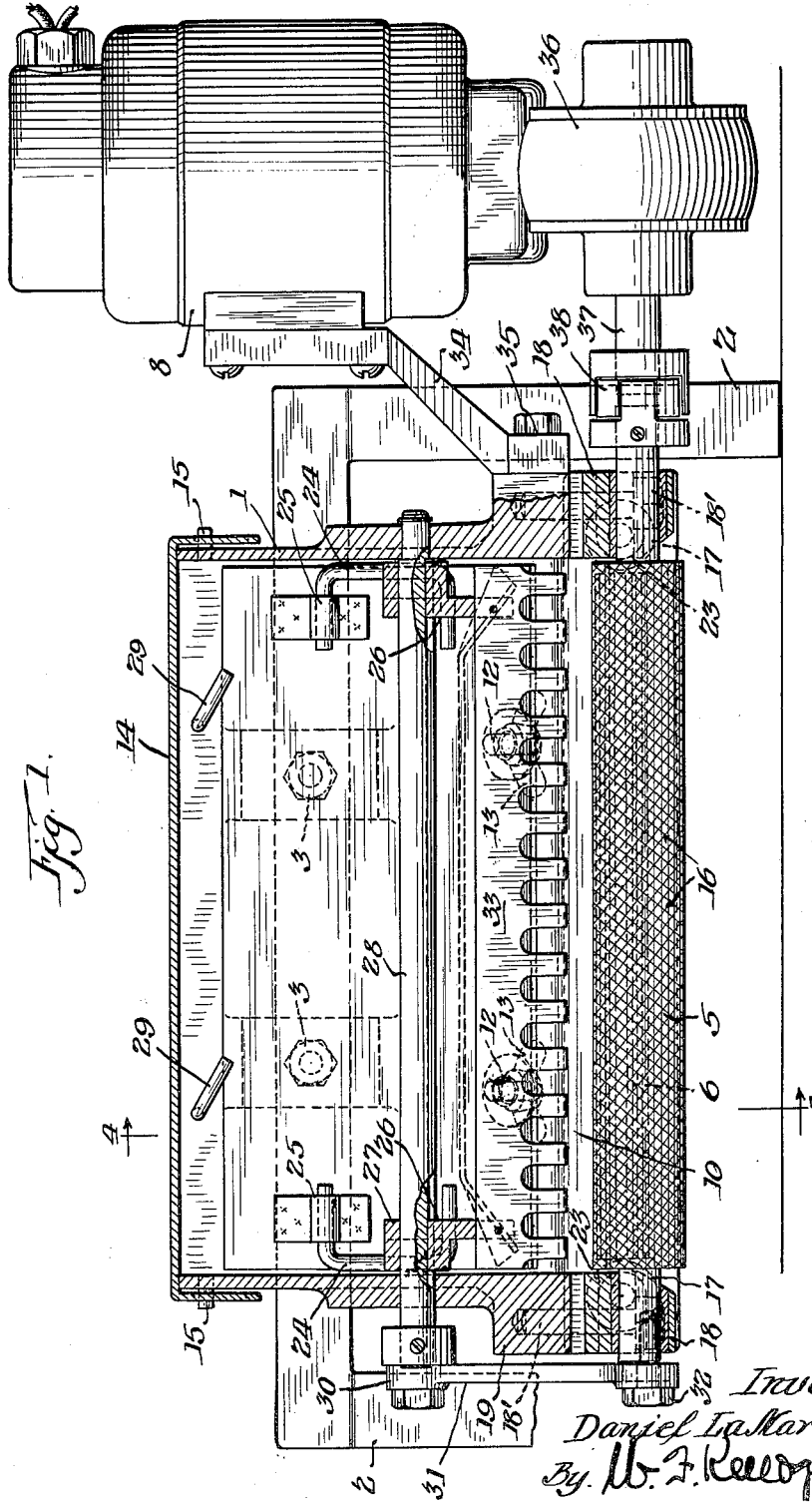
FIGURE 1 is a vertical longitudinal section through my dispensing or sprinkling machine with the electric drive motor therefor shown connected and in elevation.

Referring in detail to the drawings, the invention, generally, comprises a hopper body 1 supported on appropriate legs 2 attached to its opposite sides, as at 3, discharging downwardly throughout its length into a trough-like compartment 4 having a dispensing roll 5 in and extending longitudinally throughout its length with its opposite ends journaled in appropriate bearings, hereinafter more fully described; opposed roller stripping brushes or means 6 engaging the periphery of the roll, agitating plates 7 (also hereinafter more fully described) movably mounted within the hopper body adjacent its side walls, and an electric drive motor 8 connected to the dispensing roll.

Figure 2:
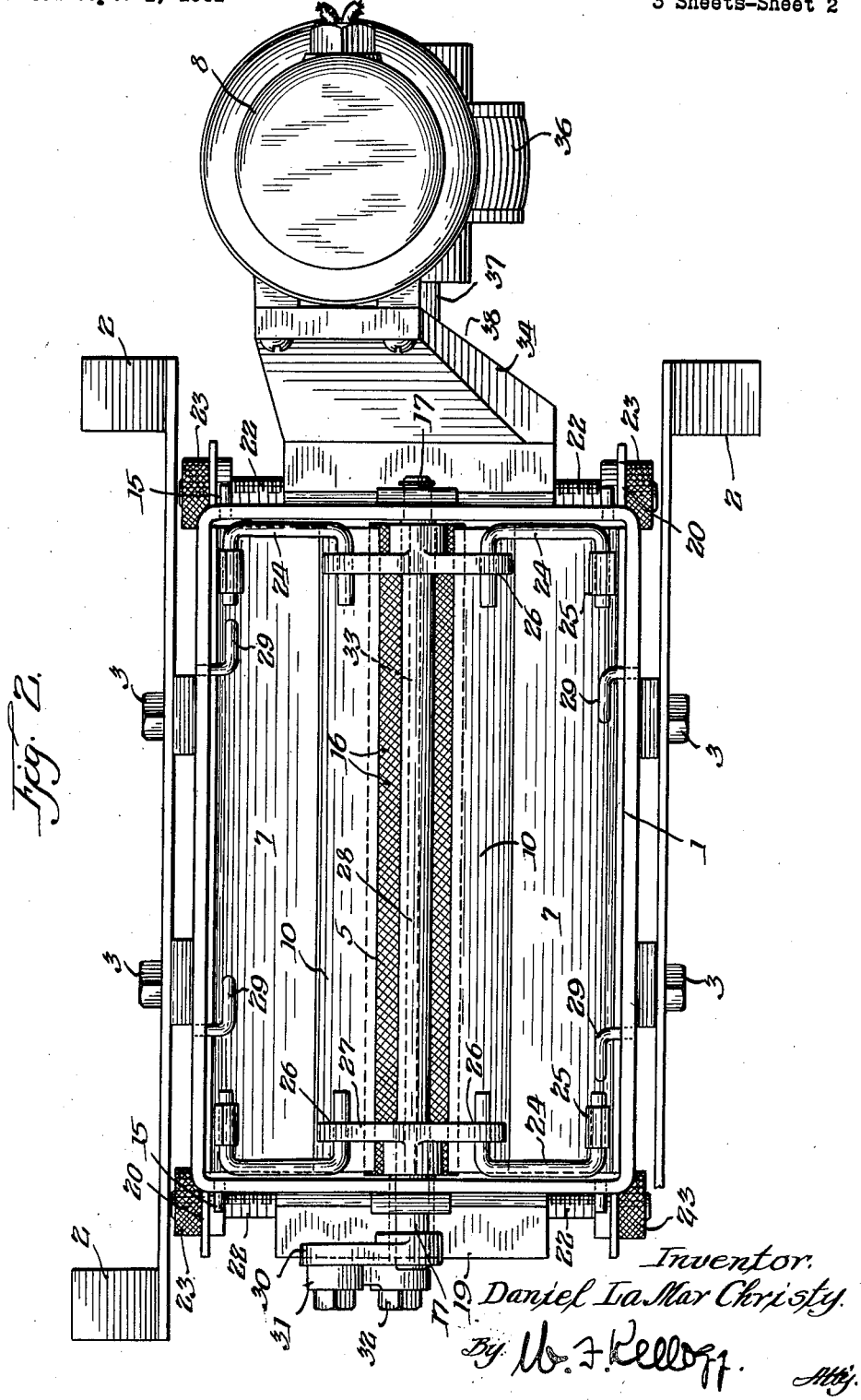
FIGURE 2 is a top side or plan view of the same.

The hopper body 1, made of sheet cast metal or other suitable material, is preferably of rectangular formation (see FIGURE 2) and has its bottom open end constricted by inwardly inclining the lower portions of its side walls, as at 9. Substantially flat extension plates 10 of lengths corresponding with the lower side wall portions 9, transversely slotted at 11, are slideably mounted thereon and secured in adjusted positions adjacent though spaced from opposite sides of the roll 5 by bolts 12 mounted on and extended upwardly from said portions, having suitable washers and locking nuts 13 engaged therewith, for an obvious purpose.

A cover 14 pivotally mounted on pintles 15 is provided to the open top of the hopper body.

The dispensing roll 5, cylindrical in shape, has a multiplicity of uni-sized pockets 16 formed in and entirely over its peripheral surface. Coaxially disposed stub-axles 17 extend from the opposite ends of the dispensing roll and are journaled in bearings 18 secured by screws 18' to adjacent underside portions of attaching blocks or extensions 19 integral with or affixed to the lower extremities of the hopper body and walls, as shown in FIGURE 1 of the drawings.

Figure 3:
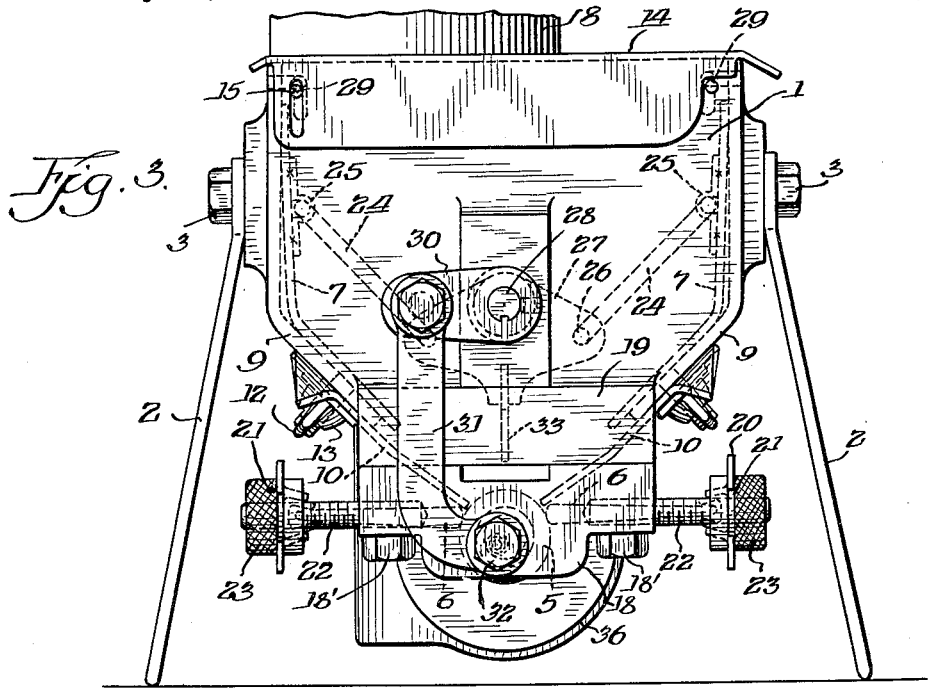
FIGURE 3 is an end elevational view of the machine taken from that end opposite to the electric drive motor connected end.
Figure 4:
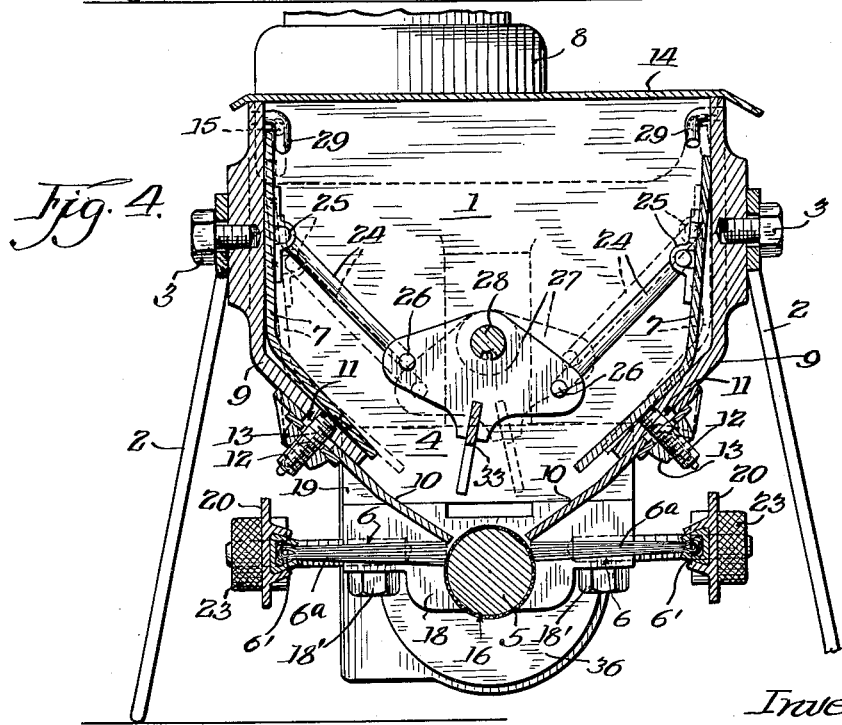
FIGURE 4 is a vertical transverse section taken on the line 4—4 of FIGURE 1, looking in the direction in which the arrows point.

To effect positive removal of matters delivered from the hopper onto the rotating dispensing roll 5 and its sprinkling or "dusting" onto a receiving material (not shown) arranged directly therebelow, the relatively opposed stripping brushes or means 6 are provided. Each comprises a body or back 6' of dovetail cross-sectional shape anchoring and supporting suitable bristles 6ª therein. The backs are slidingly introduced into and supported by bracket plates 20 of lengths greater than that of the hopper body. The opposite ends thereof are slotted or forked, as at 21, whereby to receive supporting screw threaded studs 22 and thus effect horizontal support of the brushes 6 on either side of the dispensing roll 5 in the manner shown in FIGURES 3 and 4. It will be noted, in this connection, that the bristles 6ª of each brush are in sweeping engagement with adjacent portions of the dispensing roll periphery. Hence, that with its rotation, matters to be "dusted" or sprinkled will be stripped or swept therefrom and delivered onto the aforesaid receiving material. In order that the extent of contact or stripping engagement of the brush bristles with the dispensing roll may be increased or decreased, knurled and circumferentially channelled nuts 23 are turned onto the outer ends of the studs 22. Adjacent portions of the forked or slotted ends 21 of the bracket plates 20 are engaged in the circumferential channels in the nuts. Consequently, these nuts have bearing engagement with their respective bracket plates; therefore, with rotation on their respective screw threaded nuts 23 in predetermined directions, the bracket plates and their respective brushes will be moved toward or away from the dispensing roll.

The agitating plates 7, of which there are two, each consists of sheet metal panels bent or shaped to substantially conform to the obtuse angular formation of the hopper body side walls. They are positioned adjacent the inner surfaces of these side walls (see FIGURES 3 and 4) and are supported in such positions by links 24 whose upper ends are pivotally connected thereto, as at 25; the lower ends of said links being pivotally connected at 26 to the adjacent ends of substantially triangularly shaped arms 27 fixedly mounted on or keyed to opposite end portions of a longitudinally disposed shaft 28 journaled in suitable bearings in lower and intermediate portions of the hopper body end walls. The upper sides of the plates are movably retained in their adjacency to the upper portions of the hopper body side walls by angle fingers or pins 29 engaged therewith.

One end of the shaft 28 is extended outwardly from its adjacent end wall and fixedly mounts an arm 30 thereon which, in turn, is pivotally connected to an adjacent or upper end of an L-shaped arm 31. The lower end of the latter arm has eccentric connection with the outwardly extended end of one of the roller stub-axles 17 by means of a securing screw 32 threadedly engaged in an eccentrically bored and screw threaded pocket in the outer and exposed end of said stub-axle.

As a means for further agitating the comminuted matter, i.e., powder, granular, etc. matter, within the hopper body 1 and insuring its even and uniform feeding to and distribution upon the pocketed (pockets 16) periphery of the dispensing roll 5, I fixedly and endwise mount on and between the arms 27 a comb-like or multi-fingered member 33.

From the foregoing, it will be seen that with rotation of the dispensing roll 5 oscillatory motion will be imparted by the pivotally interconnected arms 30 and 31 via the aforesaid eccentric connection with said roll, to the shaft 28. Thereby the arms 27 mounted on said shaft and within the hopper body will be oscillated, imparting reciprocal motion to the agitating plates 7 and oscillatory or rocking motion to the comb-like member 33. Thus, the aforesaid matter within the hopper body will be agitated and such agitation will assure its downward flow from the open lower end thereof with its even and uniform distribution into the pockets 16 of the rotating dispensing roll 5 for discharge therefrom onto the material which is to be "dusted" or sprinkled therewith.

In order that rotary motion shall be transmitted through the dispensing roll 5, I mount the electric drive motor 8 on a bracket 34 secured to the opposite end wall of the hopper body, as at 35. Suitable motion transmission gearing (not shown) is connected to the motor rotor, the same being housed in a casing 36 supported by or from the motor casing. A driven shaft 37 is extended from said casing 36 and connected by a suitable coupling 38 to the adjacent and extended stub-axle end 17.

Whereas I have stated that operation of my improved machine is effected by rotary motion generated by an electric drive motor, it will be understood that other and different forms of power supply may be substituted therefor, such as conditions or preference may dictate. By the same token it is to be understood that whereas I have hereinbefore described my improved machine as being supported on legs identified by the numeral 2, this type or character of support may be changed or varied as required. Mobile carriages or stands, in example, may be employed to support the machine as and where such forms of support are more practical or are required.

As and when the machine is used for "dusting" or sprinkling matters of different characters, shapes, sizes, and/or mesh, dispensing rolls, such as herein designated by the numeral 5, but having peripheral pockets 16 of shapes and sizes sufficient to receive the same from the hopper body 1 and discharge them onto a receiving material, will be employed. At such times, an interchange of rolls in the machine will be effected.

In using the machine, rotary motion is imparted to the particularly installed dispensing roll 5. Motion is transmitted from the dispensing roll to the agitating plates 7 within the hopper body 1 and to the shaft 28 via the eccentric connection of the arm 31. Thereby, such shaft will be oscillated and, in turn, will effect functioning movement of the agitating plates 7 and the comb-like member 33. Thus, the matter to be "dusted" or sprinkled onto the receiving material will be evenly and uniformly dispensed from the machine.

The material receiving the dispensed matter from the machine, of course, is arranged immediately therebelow, with the machine dispensing roll disposed transversely over and immediately above the same. Such material or materials preferably are arranged on traversing carriers (not shown). Consequently, as it moves under the machine, the dispensed matters will be continuously and evenly "dusted" or sprinkled thereupon.

To assure an adequate flow of the aforesaid matter onto the rotating dispensing roll, it will be understood that the substantially flat extension plates 10 will be appropriately adjusted with relation thereto; also that the stripping brushes 6 will be likewise adjusted with relation to the roll—this to ensure removal of the matter from the roll.

It will be understood that usage of my inproved machine is in no manner limited for usage in connection with the "dusting" or sprinkling of edible matters onto food products. The machine is equally advantageous for use in the sprinkling or distributing of non-edible matters on various articles of manufacture and, hence, has a definite field of industrial usage.

I claim:

1. A machine for dispensing and distributing comminuted materials, comprising:
   (a) a hopper having a discharge way in and disposed longitudinally and substantially medially of its bottom,
   (b) a peripherally pocketed dispensing roll rotatably mounted in and disposed longitudinally of the hopper adjacent to and throughout the length of said discharge way,
   (c) an oscillatory shaft mounted in and disposed longitudinally of the hopper above and substantially parallel to said roll,
   (d) a first arm fixedly mounted on one end of the roll exteriorly of the hopper and extended laterally therefrom,
   (e) second arms fixedly mounted on and disposed transversely of the shaft extended beyond its opposite sides and below the same,
   (f) agitating plates of lengths and widths substantially corresponding to the lengths and widths of the hopper side walls within said hopper substantially parallel to said walls and mounted for vertical reciprocal movement on each thereof,
   (g) linkage connecting certain of the extended portions of the second arms to the agitating plates whereby to transmit reciprocal motion thereto,
   (h) a multi-fingered agitating member carried by those portions of the second arms extended below said oscillatory shaft cooperable with said roll,
   (i) a substantially L-shaped arm having its lower extremity pivotally and eccentrically connected to one end of said roll exteriorly of the hopper and its upper extremity pivotally connected to the outer end of said first arm, and,
   (j) horizontally positioned relatively opposed stripping brushes adjustably supported by and below the hopper engaging the opposite sides of the roll.

2. A machine for dispensing and distributing comminuted materials, comprising:
   (a) a hopper having a discharge way in and disposed longitudinally and substantially medially of its bottom,
   (b) a peripherally pocketed dispensing roll rotatably mounted in and disposed longitudinally of the hopper adjacent to and throughout the length of said discharge way,
   (c) an oscillatory shaft mounted in and disposed longitudinally of the hopper above and substantially parallel to said roll,
   (d) a first arm fixedly mounted on one end of the roll exteriorly of the hopper and extended laterally therefrom,
   (e) second arms fixedly mounted on and disposed transversely of the shaft extended beyond its opposite sides and below the same,
   (f) agitating plates of lengths and widths substantially corresponding to the lengths and widths of the hopper side walls within said hopper substantially parallel to said walls and mounted for vertical reciprocal movement on each thereof,
   (g) linkage connecting certain of the extended portions of the second arms to the agitating plates whereby to transmit reciprocal motion thereto,
   (h) a multi-fingered agitating member carried by those portions of the second arms extended below said oscillatory shaft cooperable with said roll,
   (i) a substantially L-shaped arm having its lower extremity pivotally and eccentrically connected to one end of said roll exteriorly of the hopper and its upper extremity pivotally connected to the outer end of said first arm,
   (j) horizontally positioned relatively opposed stripping brushes adjustably supported by and below the hopper engaging the opposite sides of the roll, and,
   (k) extension plates of lengths substantially corresponding to the lengths of the hopper side walls mounted on lower portions thereof selectively slidably adjustable thereon toward and away from said roll.

References Cited in the file of this patent
UNITED STATES PATENTS

| | | |
|---|---|---|
| 254,957 | Grow | Mar. 14, 1882 |
| 625,635 | Ashley | May 23, 1899 |
| 2,870,739 | Rodli | Jan. 27, 1959 |